United States Patent
Kusel

(10) Patent No.: US 9,518,534 B2
(45) Date of Patent: Dec. 13, 2016

(54) REVERSE SCISSOR THRUST REVERSER FOR A TURBINE ENGINE

(71) Applicant: Rohr, Inc., Chula Vista, CA (US)

(72) Inventor: Curtis M. Kusel, Carlsbad, CA (US)

(73) Assignee: Rohr, Inc., Chula Vista, CA (US)

( * ) Notice: Subject to any disclaimer, the term of this patent is extended or adjusted under 35 U.S.C. 154(b) by 434 days.

(21) Appl. No.: 13/921,877

(22) Filed: Jun. 19, 2013

(65) Prior Publication Data

US 2014/0373506 A1    Dec. 25, 2014

(51) Int. Cl.
*F02K 1/72*    (2006.01)

(52) U.S. Cl.
CPC .............. *F02K 1/72* (2013.01); *F05D 2260/50* (2013.01)

(58) Field of Classification Search
CPC ................ F02K 1/68; F02K 1/70; F02K 1/72; F05D 2260/50
See application file for complete search history.

(56) References Cited

U.S. PATENT DOCUMENTS

| | | | |
|---|---|---|---|
| 3,500,645 A * | 3/1970 | Hom | F02K 1/72 239/265.29 |
| 4,185,798 A | 1/1980 | Dickenson | |
| 4,313,581 A | 2/1982 | Folmer et al. | |
| 4,545,199 A | 10/1985 | Sankey et al. | |
| 5,575,147 A | 11/1996 | Nikkanen | |
| 5,778,659 A | 7/1998 | Duesler et al. | |
| 5,927,647 A | 7/1999 | Masters et al. | |
| 6,170,254 B1 | 1/2001 | Cariola | |
| 6,293,495 B1 | 9/2001 | Aten et al. | |
| 6,546,715 B1 | 4/2003 | Blevins et al. | |
| 8,006,479 B2 | 8/2011 | Stern | |
| 8,104,262 B2 | 1/2012 | Marshall | |
| 8,109,466 B2 | 2/2012 | Aten et al. | |
| 8,109,467 B2 | 2/2012 | Murphy | |
| 8,127,529 B2 | 3/2012 | Pero et al. | |
| 8,151,551 B2 | 4/2012 | Pero | |
| 2013/0067884 A1 | 3/2013 | Bhatot | |
| 2013/0092755 A1 | 4/2013 | Aten et al. | |
| 2014/0353399 A1 * | 12/2014 | Stuart | F02K 1/72 239/11 |
| 2015/0176528 A1 * | 6/2015 | Peyron | F02K 1/72 239/265.19 |

* cited by examiner

*Primary Examiner* — Carlos A Rivera

(74) *Attorney, Agent, or Firm* — O'Shea Getz P.C.

(57) ABSTRACT

A turbine engine system includes a nacelle and a thrust reverser. The nacelle includes a first portion and a second portion that are arranged along an axis. The second portion of the nacelle moves axially relative to the first portion of the nacelle. The thrust reverser includes a blocker door and a linkage that links the blocker door to the first portion of the nacelle. The blocker door is located within and pivotally connected to the second portion of the nacelle.

15 Claims, 7 Drawing Sheets

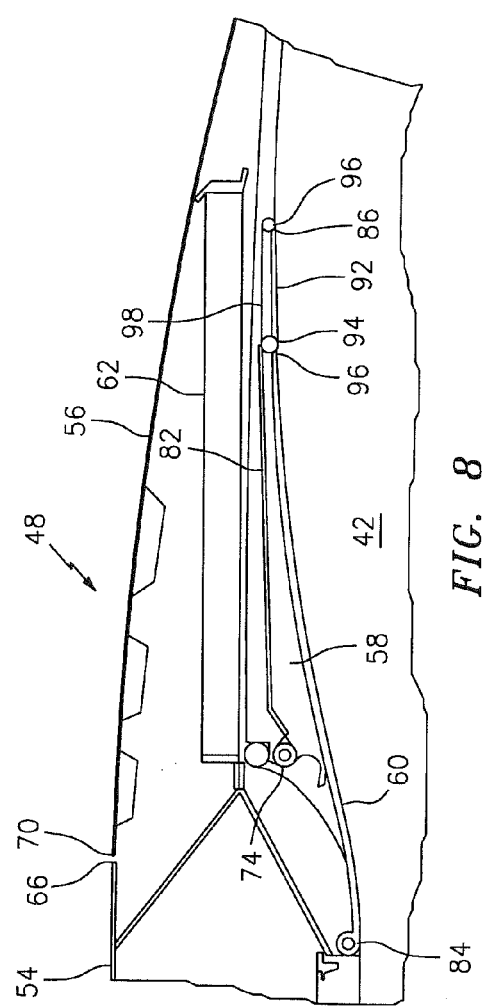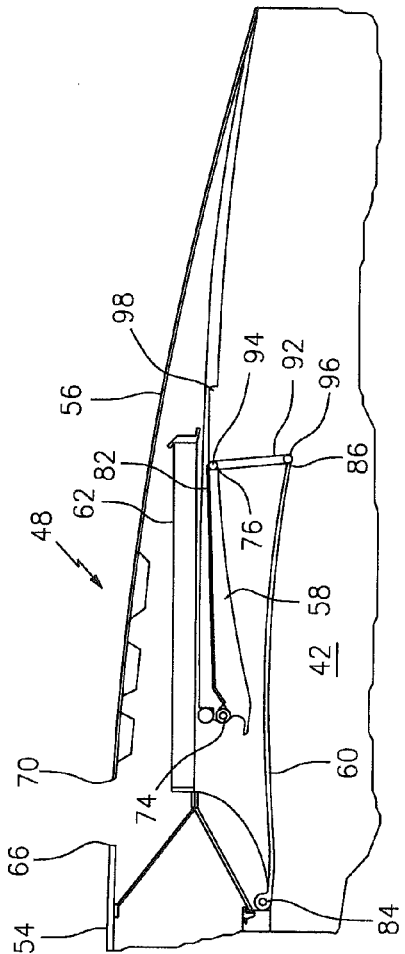

REVERSE SCISSOR THRUST REVERSER FOR A TURBINE ENGINE

BACKGROUND OF THE INVENTION

1. Technical Field

This disclosure relates generally to a turbine engine and, more particularly, to a thrust reverser for a turbine engine.

2. Background Information

A turbine engine may include a thrust reverser configured with a fan nacelle, which houses a fan section of the turbine engine. The thrust reverse may include a plurality of blocker doors, which pivot down into a bypass gas path of the turbine engine from the fan nacelle when deployed. Typically, these blocker doors are deployed utilizing a plurality of drag linkages. These drag linkages respectively link the blocker doors to a core nacelle, which is arranged radially within the fan nacelle. The drag linkages therefore extend through the bypass gas path when the blocker doors are stowed with the fan nacelle. As a result, the drag linkages may increases drag within the bypass gas path and, thus, decrease engine efficiency when the blocker doors are stowed.

There is a need in the art for an improved thrust reverser for a turbine engine.

SUMMARY OF THE DISCLOSURE

According to an aspect of the invention, a turbine engine system is provided that includes a nacelle and a thrust reverser. The nacelle includes a first portion and a second portion that are arranged along an axis. The second portion of the nacelle moves axially relative to the first portion of the nacelle. The thrust reverser includes a blocker door and a linkage, which links the blocker door to the first portion of the nacelle. The blocker door is located within and pivotally connected to the second portion of the nacelle.

According to another aspect of the invention, another turbine engine system is provided that includes a nacelle and a thrust reverser. The nacelle extends circumferentially at least partially around an axis, and includes a sleeve. The thrust reverser includes a blocker door and a linkage, which extends between and is pivotally connected to the blocker door and a stationary first portion of the nacelle. The blocker door is pivotally connected to the sleeve. The linkage deploys the blocker door as the sleeve moves axially away from the first portion of the nacelle.

According to still another aspect of the invention, another turbine engine system is provided that includes a nacelle and a thrust reverser. The nacelle extends circumferentially at least partially around an axis, and includes a sleeve. The thrust reverser includes a blocker door, a first linkage and a second linkage. The blocker door is pivotally connected to the sleeve. The first linkage is pivotally connected to a stationary first portion of the nacelle. The second linkage extends between and is pivotally connected to the blocker door and the first linkage. The first and the second linkages deploy the blocker door as the sleeve moves axially away from the first portion of the nacelle.

The first portion of the nacelle may be configured as or otherwise include a forward portion of the nacelle. The second portion of the nacelle may be configured as or otherwise include an aft portion of the nacelle.

The linkage may be configured as or otherwise include a first linkage.

The first linkage and/or the second linkage may deploy the blocker door as the second portion of the nacelle moves axially between a stowed position and a deployed position.

The first linkage may be seated in a slot of the blocker door where the second portion of the nacelle is in a stowed position. The first linkage may extend out from the slot where the second portion of the nacelle is in a deployed position.

The thrust reverser may include a second linkage that links and is pivotally connected to the blocker door and the first linkage. The second linkage may be seated in a second slot of the second portion of the nacelle where the second portion of the nacelle is in the stowed position. The second linkage may be unseated from the second slot where the second portion of the nacelle is in the deployed position.

The blocker door may be seated in a pocket of the second portion of the nacelle where the second portion of the nacelle is in a stowed position. The blocker door may extend radially inward from the second portion of the nacelle where the second portion of the nacelle is in a deployed position.

The blocker door may be seated in the pocket where the second portion of the nacelle is in a deployed position (e.g., a semi-deployed position).

The first linkage or the second linkage may be pivotally connected to the blocker door. The first linkage may also be pivotally connected to the first portion of the nacelle. The second linkage may also or alternatively be pivotally connected to the first linkage.

The blocker door may extend between a forward end and an aft end. The blocker door may be pivotally connected to the second portion of the nacelle at the forward end. The blocker door may also or alternatively be pivotally connected to the first linkage at the aft end.

The thrust reverser may include a second linkage that links and is pivotally connected to the blocker door and the first linkage.

The blocker door may extend between a forward end and an aft end. The blocker door may be pivotally connected to the second portion of the nacelle at the forward end. The blocker door may also or alternatively be pivotally connected to the second linkage at the aft end.

The thrust reverser may include a cascade of turning vanes. The second portion of the nacelle may cover the cascade in a stowed position. The second portion of the nacelle may also partially or completely uncover the cascade in a deployed position. The blocker door may direct air through the cascade where the second portion of the nacelle is in the deployed position.

The nacelle may extend circumferentially partially or completely around the axis. The second portion of the nacelle may be configured as or otherwise include a sleeve.

The blocker door may be one of a plurality of blocker doors that are arranged circumferentially around the axis. These blocker doors may be pivotally connected to the second portion of the nacelle.

The first linkage may be one of a plurality of first linkages that are arranged circumferentially around the axis. These first linkages may link the blocker door to the first portion of the nacelle.

The blocker door may be pivotally connected to the second portion of the nacelle with one or more hinges.

The foregoing features and the operation of the invention will become more apparent in light of the following description and the accompanying drawings.

BRIEF DESCRIPTION OF THE DRAWINGS

FIG. 8 is a partial side sectional illustration of the thrust reverser of FIG. 7 and the translating sleeve in a stowed position;

FIG. 9 is a partial side sectional illustration of the thrust reverser of FIG. 7 and the translating sleeve in the semi-deployed position;

DETAILED DESCRIPTION OF THE INVENTION

Figure 1:
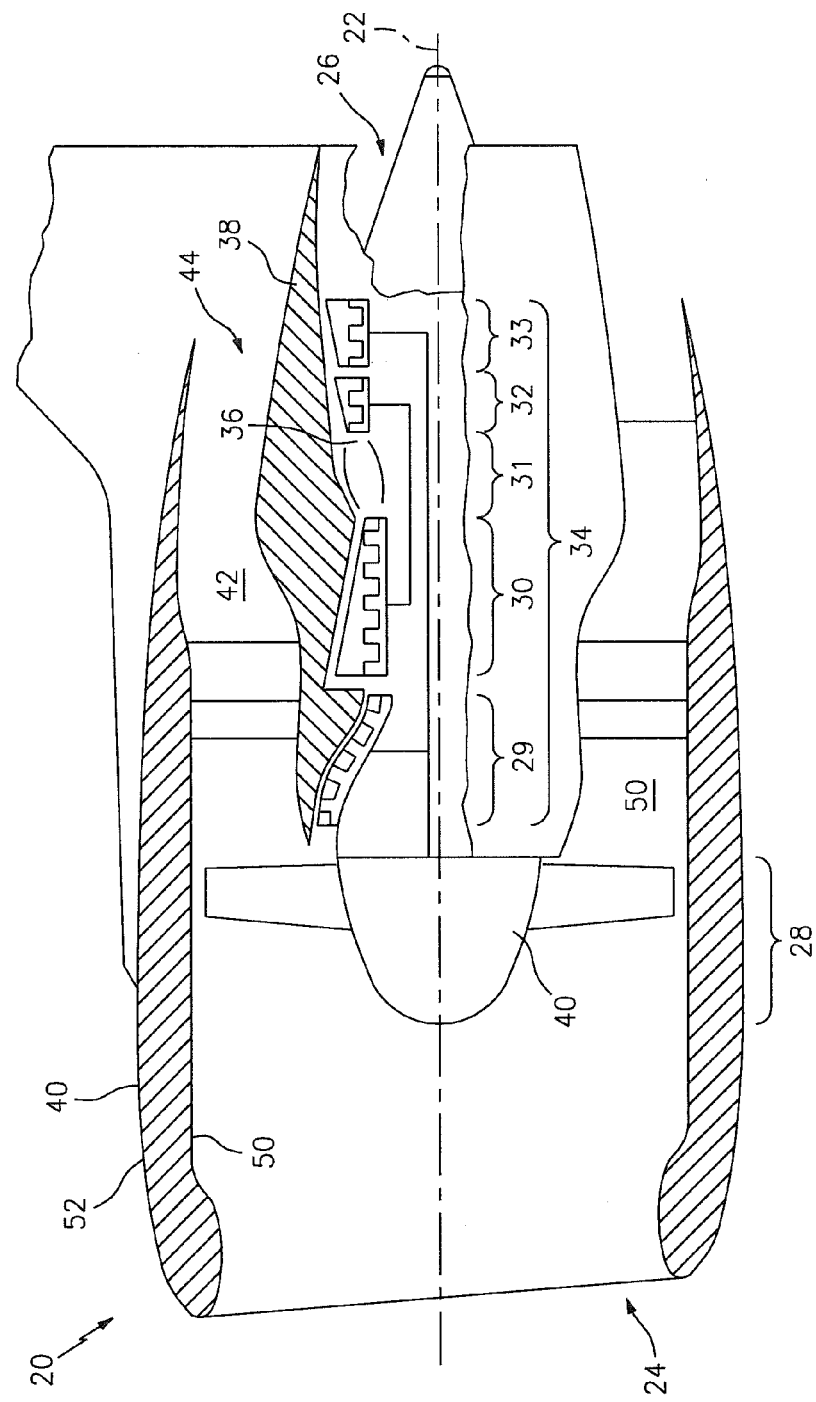
FIG. 1 is a side cutaway illustration of a turbine engine.

FIG. 1 is a side cutaway illustration of a turbine engine 20 that extends along an axis 22 between a forward airflow inlet 24 and an aft airflow core exhaust 26. The turbine engine 20 includes a fan section 28, a low pressure compressor section 29, a high pressure compressor section 30, a combustor section 31, a high pressure turbine section 32, and a low pressure turbine section 33. These engine sections 28, 29, 30, 31, 32, 33 are arranged sequentially along the axis 22. The engine sections 29, 30, 31, 32, 33 form a turbine engine core 34 having a core gas path 36. The core 34 is arranged radially within a core nacelle 38. The fan section 28 is arranged radially within a fan nacelle 40. At least a portion of the core 34 and the core nacelle 38 are also arranged radially within the fan nacelle 40, thereby defining a bypass gas path 42 between the nacelles 38 and 40.

Air enters the turbine engine 20 through the airflow inlet 24, and is directed through the fan section 28 and into the core gas path 36 and the bypass gas path 42. The air within the core gas path 36 may be referred to as "core air". The air within the bypass gas path 42 may be referred to as "bypass air". The core air is directed through the engine sections 29, 30, 31, 32, 33 and exits the turbine engine 20 through the airflow core exhaust 26. Within the combustor section 31, fuel is injected into and mixed with the core air and ignited to provide forward engine thrust. The bypass air is directed through the bypass gas path 42 and out of the turbine engine 20 through an aft airflow bypass exhaust 44 to provide additional forward engine thrust. The bypass air may also or alternatively be directed through a reverse scissor thrust reverser 46 (see FIG. 3) such as, for example, a cascade-type thrust reverser to provide reverse engine thrust.

Figure 2:
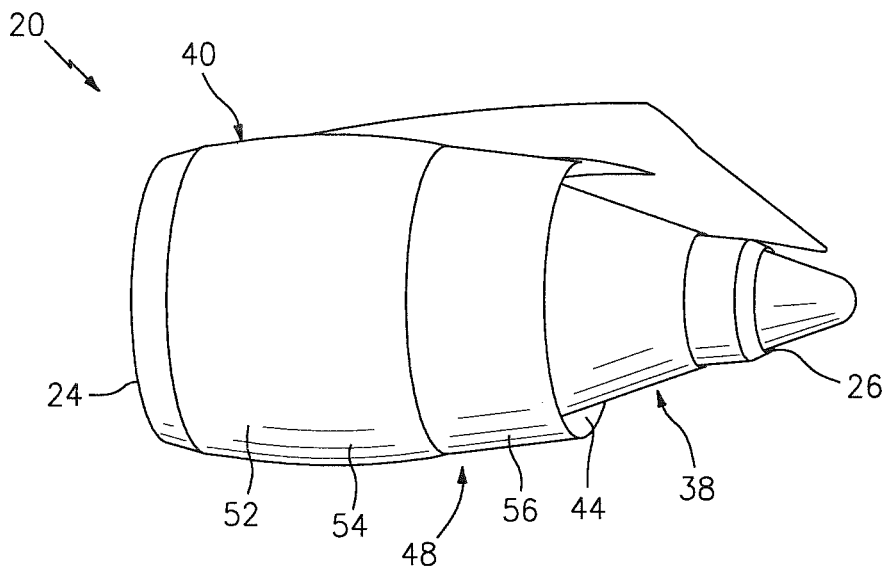
FIG. 2 is a perspective illustration of a nacelle for the turbine engine of FIG. 1 with a translating sleeve in a stowed position.
Figure 3:
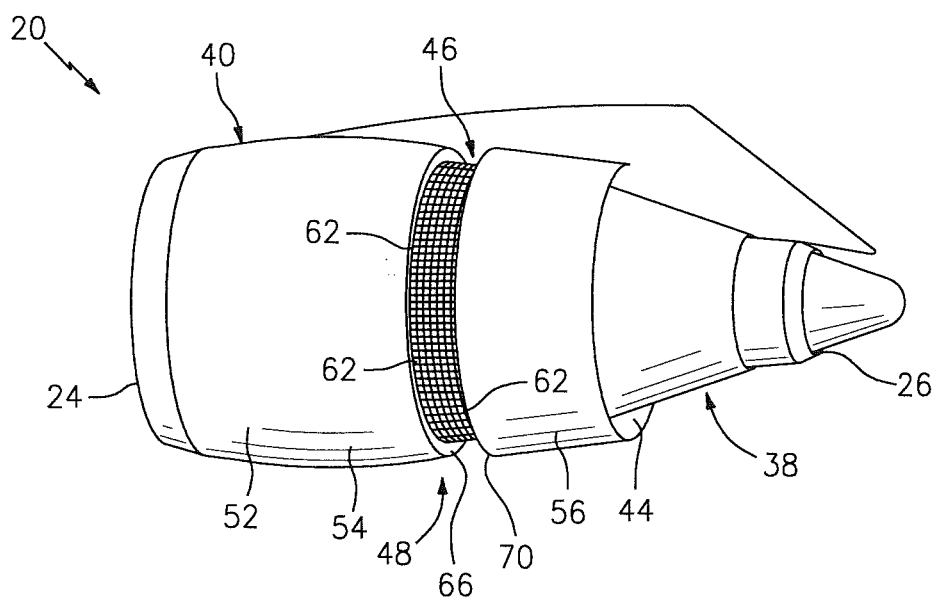
FIG. 3 is a perspective illustration of the nacelle of FIG. 2 with the translating sleeve in a deployed position.

FIGS. 2 and 3 illustrate a system 48 for the turbine engine of FIG. 1. This turbine engine system 48 includes the fan nacelle 40 and the thrust reverser 46.

Referring to FIG. 1, the fan nacelle 40 extends circumferentially at least partially (e.g., completely) around the axis 22. The fan nacelle 40 extends axially between the airflow inlet 24 and the bypass airflow exhaust 44. The fan nacelle 40 extends radially between a nacelle inner surface 50 and a nacelle outer surface 52.

Referring to FIGS. 2 and 3, the fan nacelle 40 includes a stationary forward portion 54 and an aft portion 56 configured as, for example, an axially translating sleeve. The fan nacelle 40 also includes one or more actuators (e.g., hydraulic/pneumatic pumps and pistons, electric motors, etc.) adapted to move the aft portion 56 along the axis relative to the forward portion 54 between a stowed position (see FIG. 2) and a (e.g., semi or fully) deployed position (see FIG. 3). The aft portion 56 may have a substantially tubular unitary sleeve body as illustrated in FIGS. 2 and 3. Alternatively, the aft portion 56 may include a pair of sleeve segments arranged on opposing sides of the axis. The present invention, however, is not limited to any particular aft portion configurations.

Figure 4:
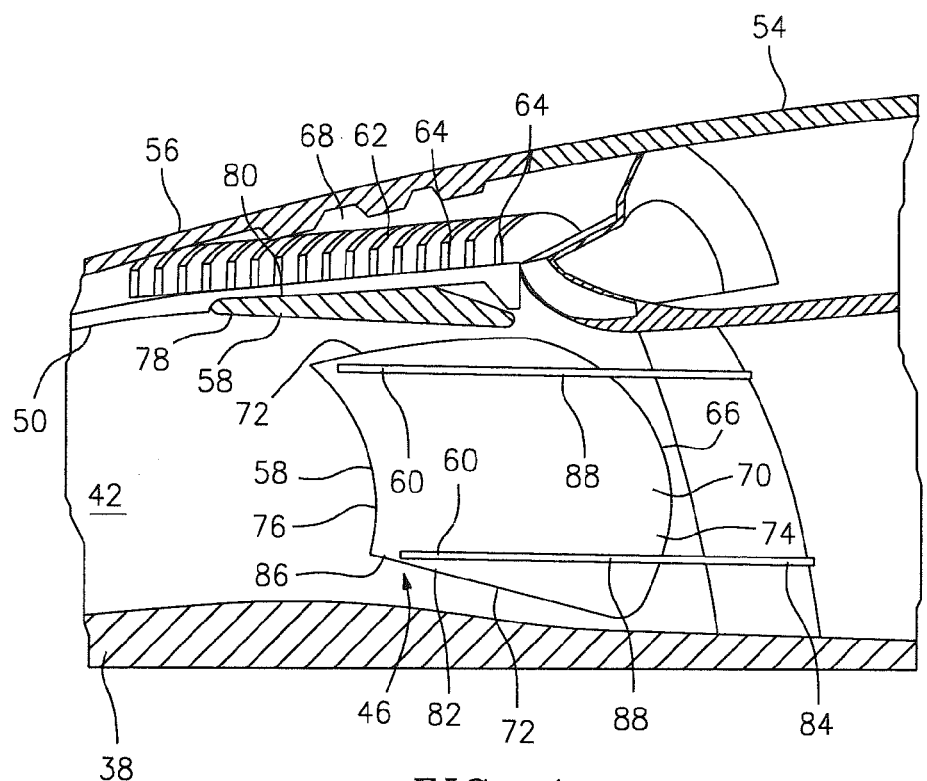
FIG. 4 is a partial perspective side sectional illustration of a thrust reverser and the translating sleeve of FIG. 2 in the stowed position.
Figure 5:
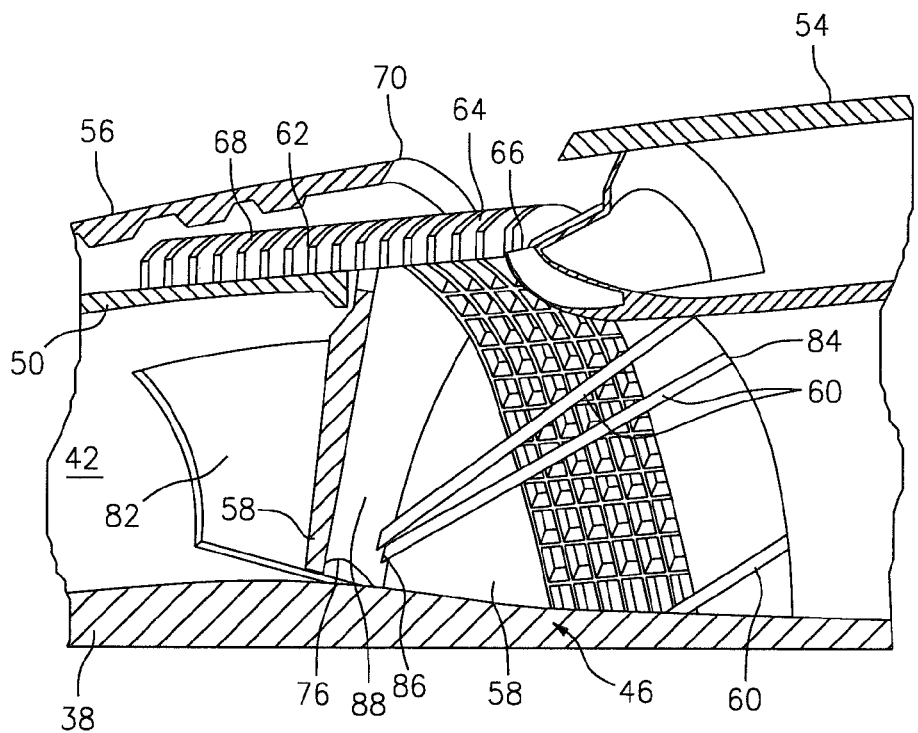
FIG. 5 is a partial perspective side sectional illustration of the thrust reverser of FIG. 4 and the translating sleeve in a semi-deployed position.
Figure 6:
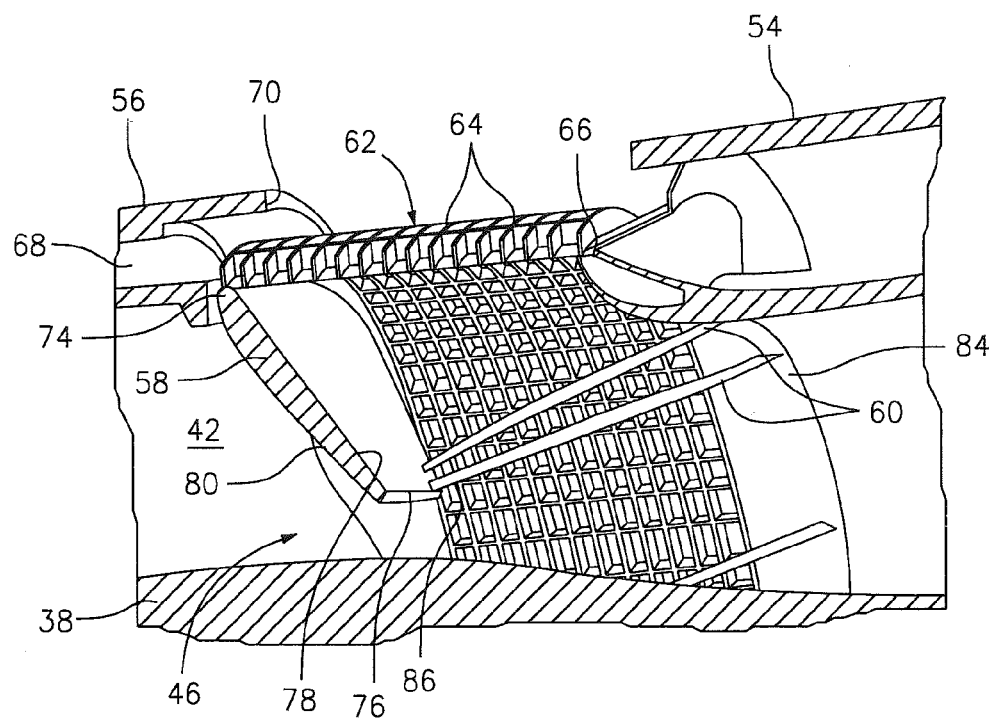
FIG. 6 is a partial perspective side sectional illustration of the thrust reverser of FIG. 4 and the translating sleeve in a fully deployed position.

Referring to FIGS. 4 to 6, the thrust reverser 46 includes one or more blocker doors 58 and one or more linkages 60. The thrust reverser 46 may also include one or more cascades 62 of turning vanes 64. The turning vanes 64 may be arranged in a plurality of parallel rows, and are adapted to redirect the flow of bypass gas flowing through the cascade 62. The cascades 62 are arranged circumferentially around the axis (see FIG. 3). One or more of the cascades 62 may each be fixedly connected to the forward portion 54 at (e.g., on, adjacent or proximate) its aft end 66. Where the aft portion 56 is in the stowed position (see FIG. 4), the cascades 62 are covered by the aft portion 56, and housed within a cavity 68 that extends axially into the aft portion 56 from its forward end 70. Where the aft portion 56 is in the deployed position (see FIG. 6), the cascades 62 are substantially uncovered and extend axially between the forward end 70 and the aft end 66.

Referring to FIG. 4, one or more of the blocker doors 58 each extends circumferentially between opposing sides 72. One or more of the blocker doors 58 each extends axially between a door forward end 74 and a door aft end 76. One or more of the blocker doors 58 each extends radially between a door inner surface 78 and a door outer surface 80. Here, the terms "forward" and "aft" describe the relative locations of the ends 74 and 76 where the respective blocker door 58 is stowed as illustrated in FIG. 4. The aft end 76, however, may be located axially forward of the forward end 74 where the door 58 is deployed as illustrated in FIG. 6. In addition, the terms "inner" and "outer" describe the relative locations of the surfaces 78 and 80 where the respective blocker door 58 is stowed as illustrated in FIG. 4. The inner surface 78, however, may be located radially outboard of the outer surface 80 where the door 58 is deployed as illustrated in FIG. 6.

The blocker doors 58 are arranged circumferentially around the axis. One or more of the blocker doors 58 are each pivotally connected to the aft portion 56 respectively at the forward ends 74 and 70 with one or more hinges. The blocker doors 58 therefore may move between a stowed position (see FIG. 4) and a first (e.g., semi) deployed position (see FIG. 5) and/or a second (e.g., fully) deployed position (see FIG. 6). In the stowed position of FIG. 4, one or more of the blocker doors 58 may each be seated in a respective pocket 82 (see also FIG. 5) that extends radially into the aft portion 56 from the nacelle inner surface 50. In this manner, the door inner surface 78 may be arranged substantially flush with the nacelle inner surface 50. In the deployed positions of FIGS. 5 and 6, one or more of the blocker doors 58 may each extend radially inward from the aft portion 56 and into the bypass gas path 42. In this manner, the blocker doors 58 may direct at least a portion of the bypass gas through the cascades 62 to provide reverse engine thrust.

One or more of the linkages 60 may each be configured as a strut that extends between a linkage forward end 84 and a linkage aft end 86. The linkages 60 are arranged circumferentially around the axis. Referring to FIG. 5, one or more of the linkages 60 are each pivotally connected (e.g., via a pin connection) to the forward portion 54 respectively at the forward and the aft ends 84 and 66. One or more of the linkages 60 are also each pivotally connected (e.g., via a pin connection) to a respective one of the blocker doors 58 respectively at the aft ends 86 and 76. The linkages 60 therefore link the blocker doors 58 to the forward portion 54. In the embodiment of FIGS. 4 to 6, a pair (or more) of the linkages 60 may link each blocker door 58 to the forward portion 54. In other embodiments, a single one of the linkages 60 may link each blocker door 58 to the forward portion 54. The present invention, however, is not limited to the foregoing embodiments.

Referring to FIGS. 4 to 6, the linkages 60 are adapted to move the blocker doors 58 between the stowed position (see FIG. 4) and the deployed positions (see FIGS. 5 and 6). The linkages 60, for example, may deploy (e.g., pull) the blocker doors 58 as the aft portion 56 moves axially away from the forward portion 54 since the blocker doors 58 are pivotally connected to the aft portion 56 and the linkages 60 link the blocker doors 58 to the forward portion 54. In contrast, the linkages 60 may stow (e.g., push) the blocker doors 58 as the aft portion 56 moves axially towards the forward portion 54.

With the thrust reverser 46 embodiment of FIGS. 4 to 6, the aft portion 56 and the blocker doors 58 may begin to deploy substantially contemporaneously. For example, where the aft portion 56 is in the stowed position illustrated in FIG. 4, the blocker doors 58 are respectively stowed and seated in the pockets 82. In addition, the linkages 60 are seated in respective slots 88 that extend radially into the blocker doors 58 from the door inner surfaces 78. In contrast, where the aft portion 56 is in the first deployed position illustrated in FIG. 5 and the second deployed position illustrated in FIG. 6, the blocker doors 58 are deployed and extend radially into the bypass gas path 42. In addition, the linkages 60 are unseated from the slots 88.

Figure 7:
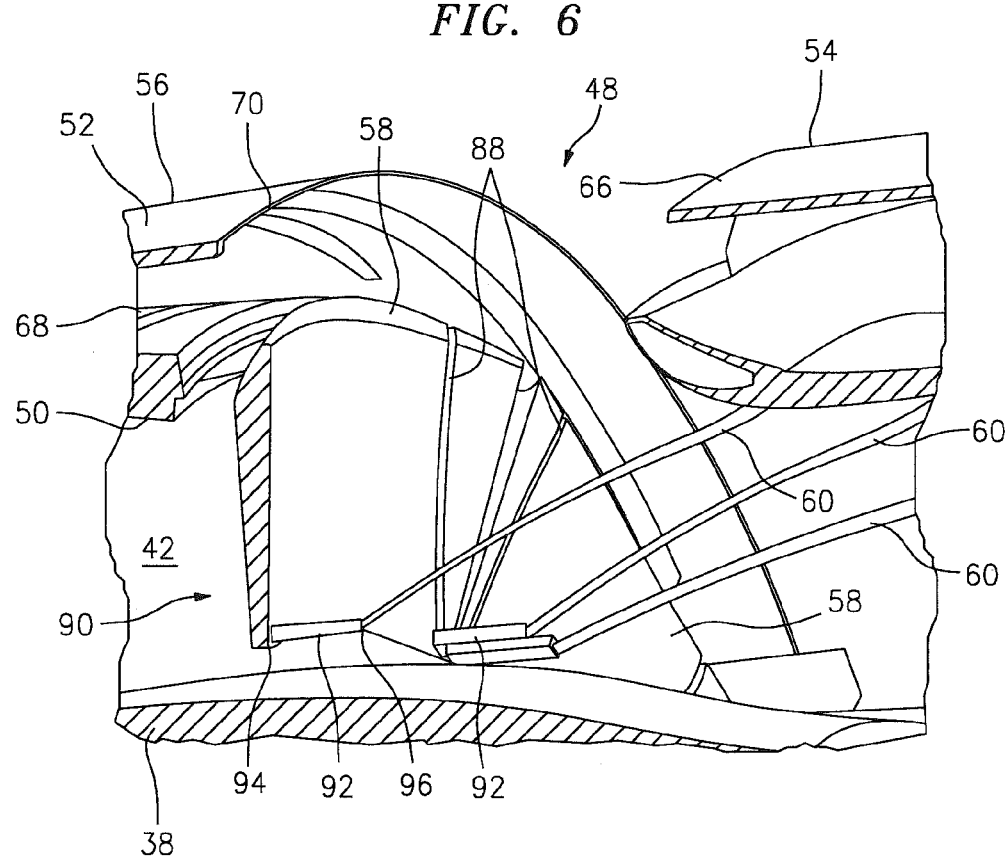
FIG. 7 is a partial perspective side sectional illustration of another thrust reverser and the translating sleeve of FIG. 2 in a semi-deployed position.

FIG. 7 illustrates an alternate embodiment thrust reverser 90 for the turbine engine system 48 of FIGS. 2 and 3. In contrast to the thrust reverser 46 of FIGS. 4 to 6, the thrust reverser 90 also includes one or more additional linkages 92 (e.g., delay linkages). One or more of these linkages 92 may each be configured as a strut that extends between a linkage forward end 94 and a linkage aft end 96. Here, the terms "forward" and "aft" describe the relative locations of the ends 94 and 96 where the respective linkage 92 is stowed as illustrated in FIG. 8. The aft end 96, however, may be located axially forward of the forward end 94 where the blocker door 58 is deployed (e.g., semi-deployed) as illustrated in FIG. 9 or deployed (e.g., fully deployed) as illustrated in FIGS. 7 and 10.

Referring to FIG. 7, the linkages 92 are arranged circumferentially around the axis. Referring now to FIGS. 8 to 10, one or more of the linkages 92 are each pivotally connected (e.g., via a pin connection) to a respective one of the linkages 60 respectively at the aft ends 96 and 86. One or more of the linkages 92 are also each pivotally connected (e.g., via a pin connection) to a respective one of the blocker doors 58 respectively at the forward and the aft ends 94 and 76. The linkages 92 therefore link the blocker doors 58 to the linkages 60. In the embodiment of FIG. 7, a pair (or more) of the linkages 92 may link each blocker door 58 to the respective linkages 60. In other embodiments, a single one of the linkages 92 may link each blocker door 58 to a respective linkage 60. The present invention, however, is not limited to the foregoing embodiments.

Figure 10:
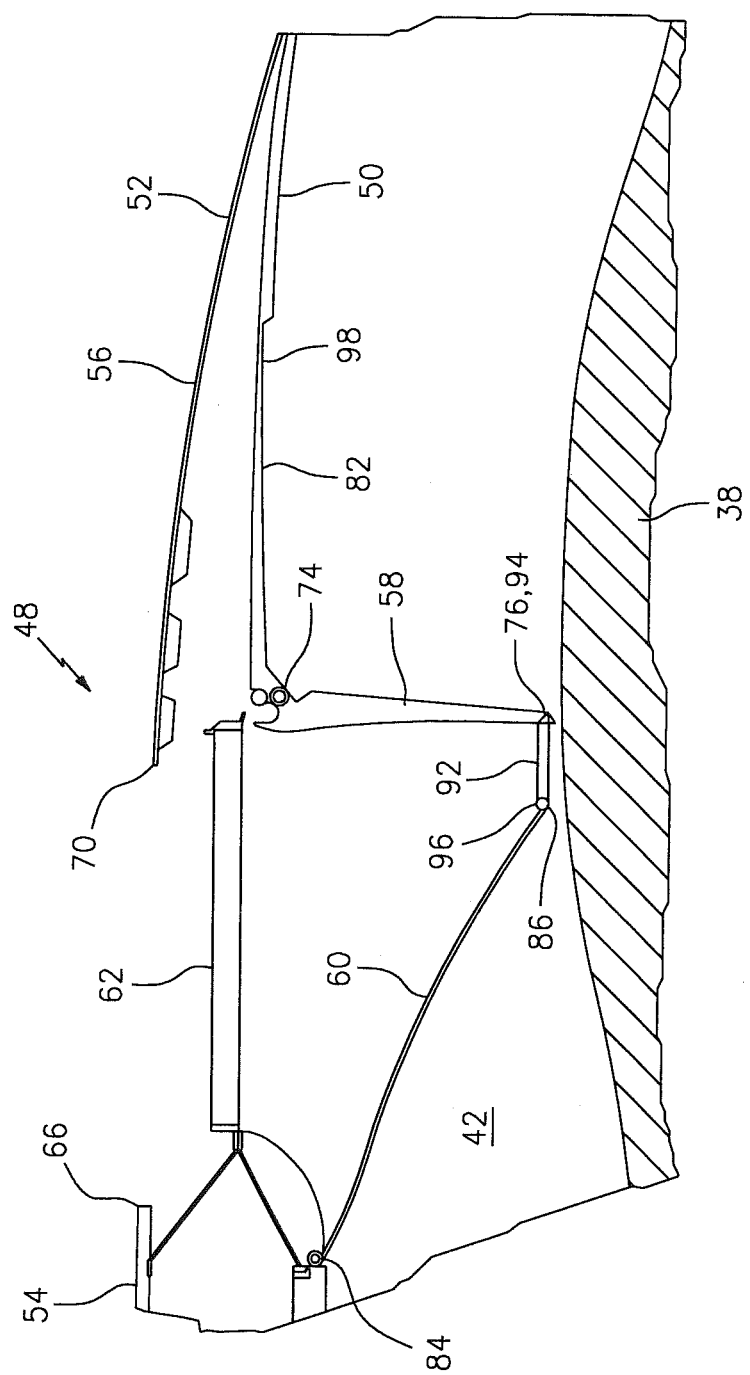
FIG. 10 is a partial side sectional illustration of the thrust reverser of FIG. 7 and the translating sleeve in a fully deployed position.

Referring to FIGS. 8 to 10, the linkages 92 are adapted to delay the deployment and stowage of the blocker doors 58. For example, as the aft portion 56 moves axially away from its stowed position of FIG. 8 to its deployed position of FIG. 9, the linkages 60 unseat the linkages 92 from respective slots 98 in the aft portion 56 and pull the linkages 92 radially into the bypass gas path 42. The blocker doors 58, however, may still be seated in the pockets 82 and stowed where the aft portion 56 is in its semi-deployed position. Thereafter, the linkages 60 and 92 deploy the blocker doors 58 as the aft portion 56 moves axially away from the forward portion 54 from the deployed position of FIG. 9 to the deployed position of FIG. 10. The linkages 92 therefore provide a period of time for the aft portion 56 to partially uncover the cascade 62 before the blocker doors 58 deploy. As a result, a flow area through the bypass gas path 42 in FIG. 8 is substantially equal to a flow area through the cascade 62 and the bypass gas path 42 in FIGS. 9 and 10. A pressure differential of the bypass gas path therefore may remain substantially unchanged as the blocker doors 58 begin to pivot into and block the bypass gas path 42.

Figure 11:
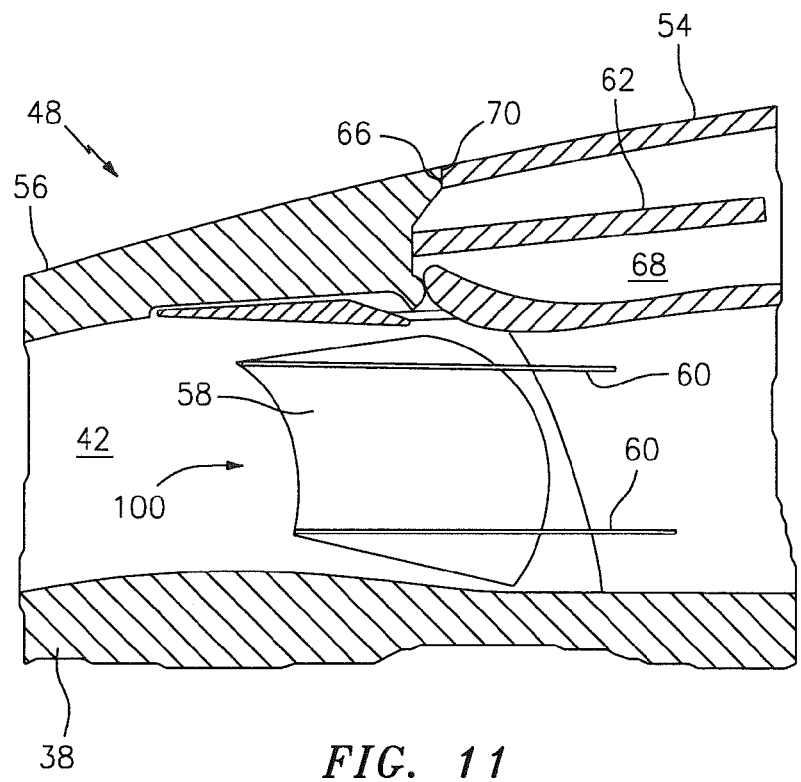
FIG. 11 is a partial perspective side sectional illustration of another thrust reverser and the translating sleeve of FIG. 2 in a stowed position.
Figure 12:
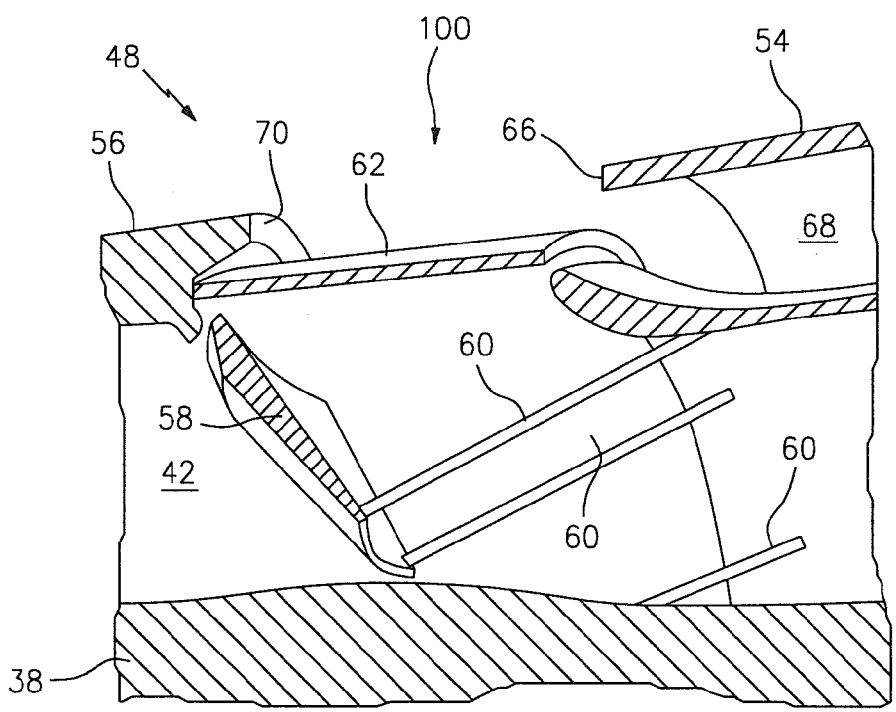
FIG. 12 is a partial perspective side sectional illustration of the thrust reverser of FIG. 11 and the translating sleeve in a deployed position.

FIGS. 11 and 12 illustrate an alternate embodiment thrust reverser 100 for the turbine engine system 48 of FIGS. 2 and 3. In contrast to the thrust reverser 46 of FIGS. 4 to 6, one or more of the cascades 62 of the thrust reverser 100 are each connected to the aft portion 56 at, for example, the forward end 70. In addition, the cavity 68 that houses the cascades 62 extends into the forward portion 54 from the aft end 66. In this manner, the cascades 62 may deploy as the aft portion 56 moves away from the forward portion 54, and may stow as the aft portion 56 moves towards the forward portion 54.

One or more components of the turbine engine system 48 may have various configurations other than those described above and illustrated in the drawings. The aft portion 56, for example, may be configured as a stationary portion of the fan nacelle 40, whereas the forward portion 54 may be configured as a translating sleeve that moves along the axis 22. In another example, one or more of the linkages 60 or 92 may each be pivotally connected to a respective blocker door 58 at a location between the door forward and aft ends 74 and 76; e.g., at a location about one third (⅓) of a distance from the aft end 76 to the forward end 74. The present invention therefore is not limited to any particular turbine engine system 48 component configurations.

The turbine engine system 48 may be included in various turbine engines other than the one described above. The turbine engine system 48, for example, may be included in a geared or non-geared turbine engine configured with a single spool, with two spools (e.g., see FIG. 1), or with more than two spools. The present invention therefore is not limited to any particular types or configurations of turbine engines.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined within any one of the aspects and remain within the scope of the invention. Accordingly, the present invention is not to be restricted except in light of the attached claims and their equivalents.

What is claimed is:

1. A turbine engine system, comprising:
a nacelle including a first portion and a second portion that are arranged along an axis, wherein the second portion of the nacelle moves axially relative to the first portion of the nacelle; and
a thrust reverser including a blocker door and a linkage that links the blocker door to the first portion of the nacelle, wherein the blocker door is located within and pivotally connected to the second portion of the nacelle;
wherein the linkage comprises a strut, a first end of the strut is directly pivotally connected to the first portion of the nacelle, and a second end of the strut is directly pivotally connected to the blocker door; and
wherein a straight-line distance between the first end and the second end is constant as the linkage moves the blocker door.

2. The system of claim 1, wherein the first portion of the nacelle comprises a forward portion of the nacelle, and the second portion of the nacelle comprises an aft portion of the nacelle.

3. The system of claim 1, wherein the linkage deploys the blocker door as the second portion of the nacelle moves axially between a stowed position and a deployed position.

4. The system of claim 1, wherein
the linkage is seated in a slot of the blocker door where the second portion of the nacelle is in a stowed position; and
the linkage extends out from the slot where the second portion of the nacelle is in a deployed position.

5. The system of claim 1, wherein
the blocker door is seated in a pocket of the second portion of the nacelle where the second portion of the nacelle is in a stowed position; and
the blocker door extends radially inward from the second portion of the nacelle where the second portion of the nacelle is in a deployed position.

6. The system of claim 5, wherein the blocker door is seated in the pocket where the second portion of the nacelle is in a semi-deployed position.

7. The system of claim 1, wherein
the blocker door extends between a forward end and an aft end; and
the blocker door is pivotally connected to the second portion of the nacelle at the forward end, and pivotally connected to the linkage at the aft end.

8. The system of claim 1, wherein
the thrust reverser further includes a cascade of turning vanes;
the second portion of the nacelle covers the cascade in a stowed position and at least partially uncovers the cascade in a deployed position; and
the blocker door directs air through the cascade where the second portion of the nacelle is in the deployed position.

9. The system of claim 1, wherein the nacelle extends circumferentially at least partially around the axis, and the second portion of the nacelle comprises a sleeve.

10. The system of claim 1, wherein the blocker door is one of a plurality of blocker doors that are arranged circumferentially around the axis and that are pivotally connected to the second portion of the nacelle.

11. The system of claim 1, wherein the linkage is one of a plurality of linkages that are arranged circumferentially around the axis and that link the blocker door to the first portion of the nacelle.

12. The system of claim 1, wherein the blocker door is pivotally connected to the second portion of the nacelle with one or more hinges.

13. A turbine engine system, comprising:
a nacelle extending circumferentially at least partially around an axis, and including a sleeve; and
a thrust reverser including a blocker door and a strut that extends between a first end and a second end, the first end is pivotally connected to and static relative to the blocker door and the second end is pivotally connected to and static relative to a stationary first portion of the nacelle;
wherein the blocker door is pivotally connected to the sleeve, and the strut deploys the blocker door as the sleeve moves axially away from the first portion of the nacelle;
wherein a straight line distance between the first end and the second end is fixed throughout movement of the strut during blocker door deployment.

14. The system of claim 13, wherein
the blocker door is seated in a pocket of the sleeve where the sleeve is in a stowed position; and
the blocker door extends radially inward from the sleeve where the sleeve is in a deployed position.

15. A turbine engine system, comprising:
a nacelle including a first portion and a second portion that are arranged along an axis, wherein the second portion of the nacelle is configured to move axially relative to the first portion of the nacelle; and
a thrust reverser including a blocker door and a strut, wherein the blocker door is located within and pivotally connected to and static relative to the second portion of the nacelle, wherein the strut extends axially from the first portion of the nacelle to the blocker door, wherein a first end of the strut is pivotally connected to and static relative to the first portion of the nacelle, and wherein a second end of the strut is pivotally connected to the blocker door;
wherein the strut is configured such that the first end is static relative to the second end.

* * * * *